Dec. 20, 1960

G. MYRICK 2,965,070

SELECTIVE BIRD FEEDER

Filed Feb. 11, 1958

INVENTOR.
GEORGE MYRICK

BY Thomas W. Y. Clark

INVENTOR.
GEORGE MYRICK

United States Patent Office 2,965,070
Patented Dec. 20, 1960

2,965,070

SELECTIVE BIRD FEEDER

George Myrick, 5415 Springlake Way, Baltimore 12, Md.

Filed Feb. 11, 1958, Ser. No. 714,598

7 Claims. (Cl. 119—51)

This invention relates to a selective bird feeder which will make the food available for birds under a predetermined weight and prevent those of greater weight from feeding.

It has heretofore been proposed to pivot a platform-like perch before a feed opening in a hopper on which numerous birds could congregate so that no counterweight could be determined which would prevent undesirable birds from feeding.

One object of the instant invention is to arrange a feeding perch in such a position that only a single bird can utilize it and so feed from a given opening in a hopper.

Another object of the invention is to mount the perch to tilt away from the opening so that a heavier weight bird, heavier than designed by the counterweight to feed, will either fall from the perch because of confusion caused by its movement or because of being removed from the location of the food platform or because of the opening to the food platform being closed by the movement of the perch.

Another object of the invention is to make the counterweights adjustable so that birds of varying weights can feed, as the bird fancier may desire.

Another object of the invention is to arrange means in front of the food opening to inhibit the bird straddling a hold both upon the perch and food platform.

Another object of the invention is to cover the platform and hopper with a weather-proof cover which will not be blow open or off and which will prevent the food from becoming moist thereby permitting the food to be dispensed in a regulated amount depending upon its consumption.

Other objects and advantages of the invention will be apparent from the following description and the accompanying drawings forming a part hereto and in which:

Figure 3 is a fragmentary sectional view on line 3—3 of Figure 1.

In the drawings similar numerals refer to similar parts throughout the several views.

Figure 1:
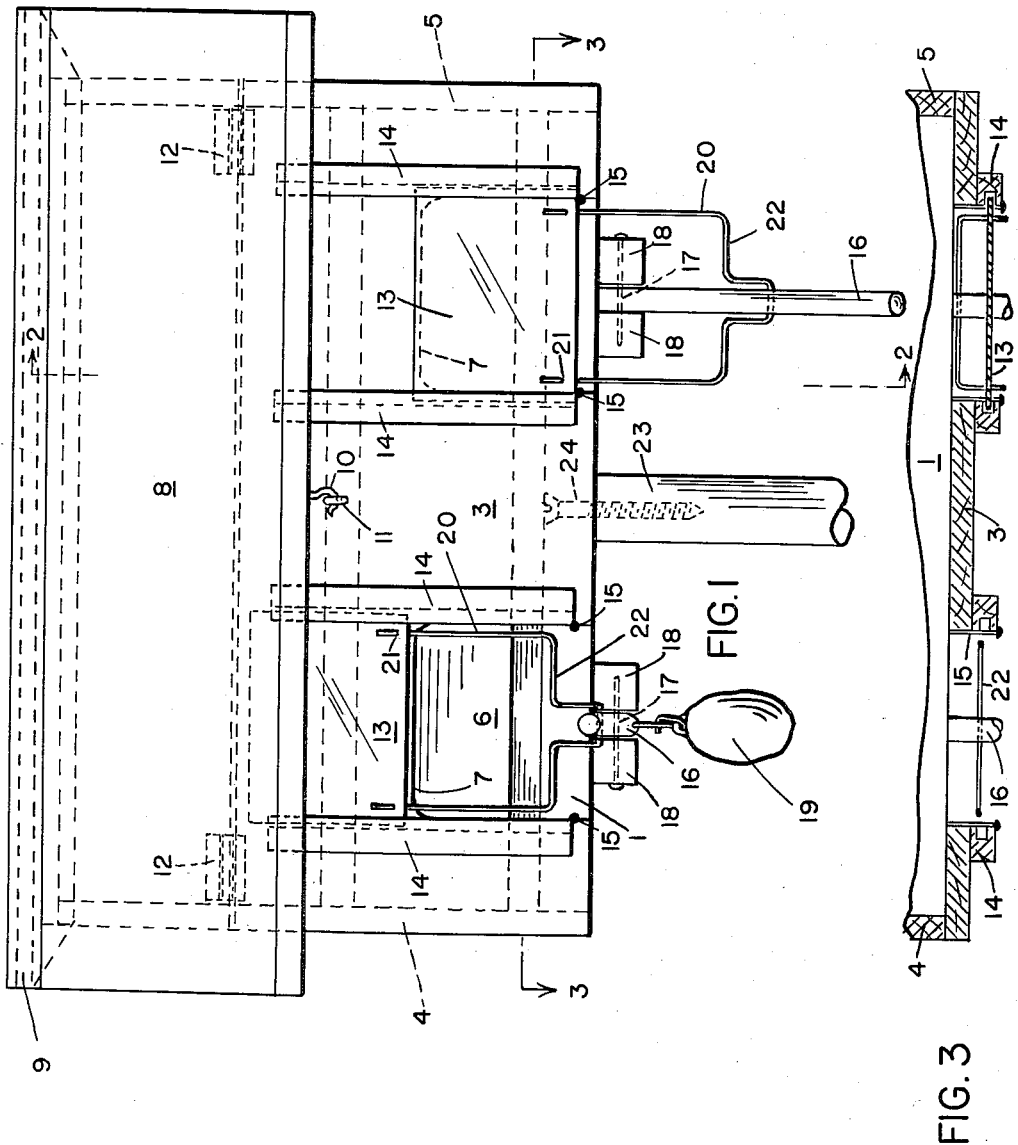
Figure 1 is a front elevation of the preferred embodiment of the invention.
Figure 2:
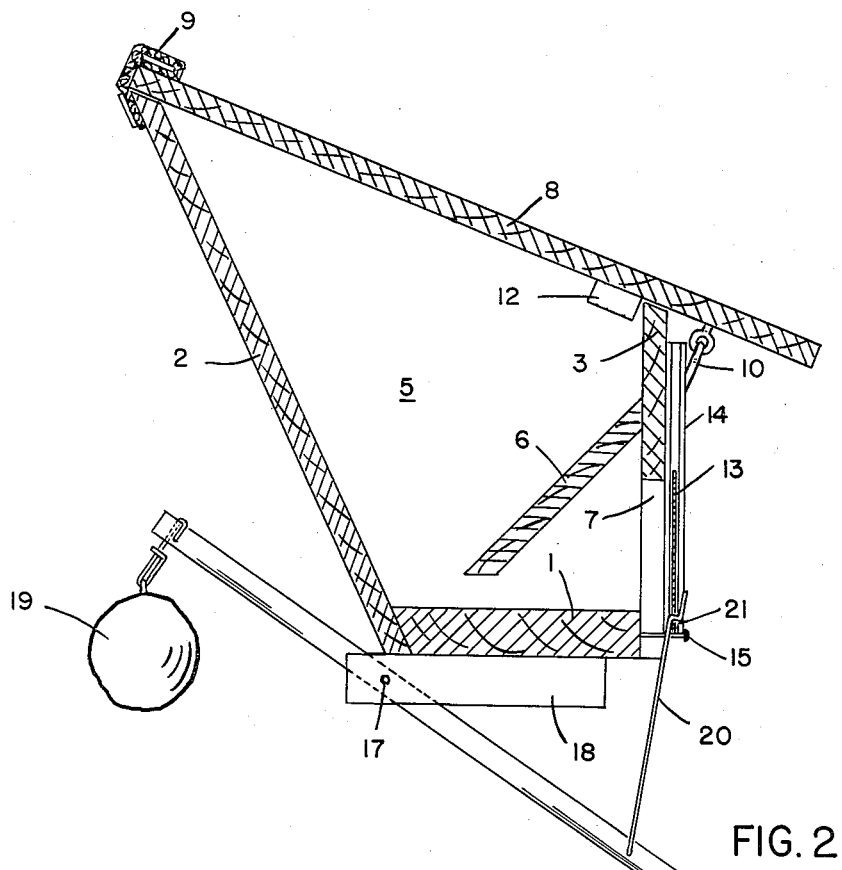
Figure 2 is a sectional view on line 2—2 of Figure 1.

The feeder is preferably a hopper having a floor 1, a rear wall 2, a front wall 3 and end walls 4 and 5 and interior partition 6 which is so sloped in relationship to the rear wall 2 as to allow the grain to fall upon the floor 1 of the hopper slowly and in relation to its consumption from the front of the floor or platform 1.

The front wall 3 has two openings 7 before which the birds feed. The hopper preferably has a sloping cover or top 8 hinged with a weather-proof hinge 9 of fabric reinforced plastic which securely prevents water from seeping through the juncture of the top 8 and the back 2. The top 8 is preferably held closed by the hook 10 fastened into the eye 11 and the top has two blocks 12 to properly space it in relation to the front wall 3 and the end walls 4 and 5.

In front of each of the openings 7 is preferably placed a sliding door 13, slidable in guides 14 at either side of the openings 7. Stop pins 15 limit the downward movement of the doors and the doors are slidable from the guides 14 when the top 8 is raised.

Figure 4:
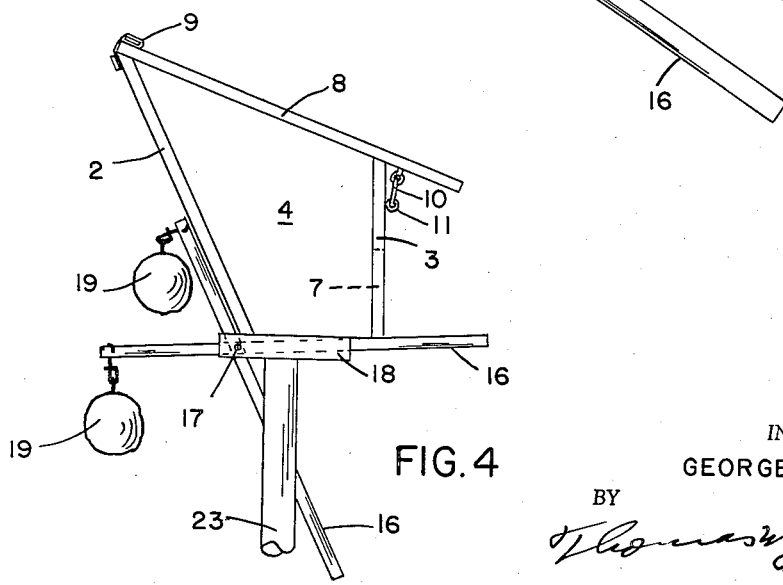
Figure 4 is an end elevation of an alternate form of the invention.

Under the hopper and preferably placed normal to its front are round perch rods 16 pivoted at 17 in blocks 18 and these rods are counterbalanced by a weight 19 to hold the rods nearly horizontal, preferably they slope slightly upwardly as shown in Figure 4 and this result is achieved by placing the pivot point 17 slightly below the bottom 1 of the hopper, this gives a point contact with the hopper and reduces the freezing area. The perch rod 16 is preferably pivoted at about two-thirds back from its front so that a bird perching on its front end must weigh a trifle over half the counterweight before the rod pivots downwardly. By means of preferably U-shaped yoke 20 passing at its bottom through the perch rod 16 and at its top by angles bent in the yoke ends through openings 21 in the doors 13, the doors are opened and closed in response to the perch rod movements. Doors 13 are preferably made of aluminum or plastic in order to reduce their weight and mass. It will be apparent that when a door is opened, or is up to expose the food on the platform 1 that the cross-members 22 of the yoke 20 are substantially in a line with and forward of the front face of the floor 1, as shown at the left in Figure 1.

The feeder of this invention is preferably mounted on a post 23 affixed by screw 24 to the floor 1 of the hopper and the post 23 may be secured in the ground in the bird fancier's yard.

In actual operation it has been observed that starlings eat much more food that the desirable birds like the chickadee, the warbler, the gold-finch, the tufted titmouse, the vireo, the yellow bellied sap-sucker or the cardinal and many other desirable birds. These desirable birds are mostly also considerably lighter in weight than the starling. Most of the desirable birds weigh considerably less than three ounces whereas the starling weighs over three ounces. The moving parts of the instant invention are so friction free and light and so free from freezing and change of weight by water or ice that they actually permit a micrometer adjustment to a tenth of an ounce enabling the device to permit birds to feed below a selected weight and prevent those above that weight from feeding.

In the preferred feeder this is accomplished by confusing the bird by the tilting of the perch as shown in the preferred feeder and also as shown in this feeder by drawing the door closed over the opening for the food. In the alternate modification as shown in Figure 4 the tilting of the perch goes to such an extent as to throw the bird from the perch where the door is not used. It has been interesting to observe the ingenious starling feeding from the hopper of Figure 4 grasp the perch with one foot and the bottom of the hopper opening with the other foot and so divide his weight that the counterweight was ineffective to throw him and he was able to eat at leisure from the hopper.

In placing the door over the openings the portions 22 of the yoke prevent the grasping of the floor at the opening by the bird because the bird grasps the portion 22 of the yoke instead, and with the sinking of the perch with the yoke attached it is defeated in its effort to keep the door from being closed. In actual use in the locality where the feeder has been erected, the amount of food that has been held by the hopper lasts approximately two weeks but when starlings are allowed to feed, the same amount of food lasts approximately two days, It will be apparent that many modifications may be made in the embodiments of the invention above described without departing from its spirit.

What is claimed as new and is desired to be secured by Letters Patent is:

1. A selective bird feeder comprising a food holding platform, a walled enclosure therearound and a cover thereover, said walled enclosure having a feeding opening of a size restricted to a single bird feeding therefrom therein extending upwardly from the platform, the food holding platform being vertically within the boundaries of the walled enclosure a single counterweighted substantially round perch rod pivotally connected to the feeder and extending before the opening projecting from the platform a length limited to receive a single bird thereon, the counterweight being of a weight to hold the perch rod when used by a single bird of predetermined weight in feeding relation to the platform and opening, the weight of a heavier bird overbalancing the counterweight and tilting the perch rod downwardly away from the platform and opening.

2. The feeder of claim 1 in which the perch rod extends outwardly from the opening and the counterweight is to the rear thereof.

3. The feeder of claim 1 including a weather-proof hinge between the cover and walled enclosure.

4. The feeder of claim 1 including a vertically movable door mounted on the wall of the enclosure adjacent the opening, and control connections between the door and perch rod to close the door upon downward movement of the perch rod and open the door upon upward movement of the perch rod.

5. A selective bird feeder comprising a food holding platform, a walled enclosure therearound and a cover thereover, said walled enclosure having a feeding opening of a size restricted to a single bird feeding therefrom therein extending upwardly from the platform, the food holding platform being vertically within the boundaries of the walled enclosure a single counterweighted substantially round perch rod pivotally connected to the feeder and extending before the opening projecting from the platform a length limited to receive a single bird thereon, the counterweight being of a weight to hold the perch rod when used by a single bird of predetermined weight in feeding relation to the platform and opening, a movable door mounted on the wall of the enclosure adjacent the opening connected to the perch rod to move in unison therewith, the weight of a heavier bird overbalancing the counterweight and tilting the perch rod downwardly, the downward movement of the perch rod moving the door to close the opening.

6. A selective bird feeder comprising a food holding platform, a walled enclosure therearound and a cover thereover, said walled enclosure having a feeding opening of a size restricted to a single bird feeding therefrom therein extending upwardly from the platform, the food holding platform being vertically within the boundaries of the walled enclosure a single counterweighted substantially round perch rod pivotally connected to the feeder and extending before the opening projecting from the platform a length limited to receive a single bird thereon, the counterweight being of a weight to hold the perch rod when used by a single bird of predetermined weight in feeding relation to the platform and opening, the weight of a heavier bird overbalancing the counterweight and tilting the perch rod downwardly to eject the heavier bird from the perch rod and away from the platform and opening.

7. A selective bird feeder comprising a food holding platform, a walled enclosure therearound and a cover thereover, said walled enclosure having a feeding opening of a size restricted to a single bird feeding therefrom therein extending upwardly from the platform, the food holding platform being vertically within the boundaries of the walled enclosure a single counterweighted substantially round perch rod pivotally connected to the feeder and extending before the opening projecting from the platform a length limited to receive a single bird thereon, the counterweight being of a weight to hold the perch rod when used by a single bird of predetermined weight in feeding relation to the platform and opening, a door slidably mounted on the wall of the enclosure adjacent the opening and connected to the perch rod to move in unison therewith, the weight of a heavier bird overbalancing the counterweight and tilting the perch rod downwardly and sliding the door over the opening.

References Cited in the file of this patent

UNITED STATES PATENTS

| 1,062,610 | Schisler | May 27, 1913 |
| 1,922,435 | Harris | Aug. 15, 1933 |
| 2,230,058 | Hornung | Jan. 28, 1941 |

FOREIGN PATENTS

| 157,822 | Sweden | Feb. 12, 1957 |

OTHER REFERENCES

Popular Mechanics Magazine, January 1943, page 7.